US012766481B1

(12) United States Patent
Tahir et al.

(10) Patent No.: US 12,766,481 B1
(45) Date of Patent: Oct. 20, 2026

(54) PHOTOCATALYST-FREE SEAWATER HYDROGEN SULFIDE SPLITTING FOR HYDROGEN PRODUCTION

(71) Applicant: United Arab Emirates University, Al Ain (AE)

(72) Inventors: Muhammad Tahir, Al Ain (AE); Malaz Suliman, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/321,878

(22) Filed: Sep. 8, 2025

(51) Int. Cl.
*B01J 19/12* (2006.01)
*B01D 53/00* (2006.01)
(Continued)

(52) U.S. Cl.
CPC .......... *B01J 19/127* (2013.01); *B01D 53/007* (2013.01); *B01D 53/52* (2013.01); *B01D 53/78* (2013.01); *B01F 23/233* (2022.01); *B01F 33/45* (2022.01); *B01J 19/0066* (2013.01); *C01B 3/042* (2013.01); *G01N 23/2209* (2018.02); *G01N 30/88* (2013.01); *B01D 2257/304* (2013.01); *B01D 2258/02* (2013.01); *B01D 2259/802* (2013.01); *B01J 2219/00164* (2013.01); *B01J 2219/0869* (2013.01); *B01J 2219/0884* (2013.01); *B01J 2219/1203* (2013.01); *G01N 2030/025* (2013.01)

(58) Field of Classification Search
None
See application file for complete search history.

(56) References Cited

U.S. PATENT DOCUMENTS 7,220,391 B1 * 5/2007 Huang .................. B01D 53/52 204/157.52

OTHER PUBLICATIONS

Liu et al. "Stability Test on Power Supply to the Xenon Lamp of Solar Simulator" J. Phys.: Conf. Ser. 2021, 1820, 012142 (Year: 2021).*

(Continued)

*Primary Examiner* — Brian W Cohen
*Assistant Examiner* — Nathanael Jason Downes
(74) *Attorney, Agent, or Firm* — MH2 Technology Law Group, LLP

(57) ABSTRACT

The present disclosure provides a method for producing hydrogen comprising providing seawater containing dissolved sodium chloride (NaCl), introducing hydrogen sulfide ($H_2S$) gas into the seawater to form a reaction mixture containing dissolved $H_2S$ and bisulfide ions ($HS^-$), exposing the reaction mixture to solar irradiation in the absence of any photocatalyst, and generating hydrogen gas through photoexcitation of the bisulfide ions and seawater splitting facilitated by the dissolved $H_2S$ species. The seawater has a NaCl concentration of approximately 3.5 wt. %. The reaction mixture is maintained at ambient temperature during the solar irradiation. The hydrogen gas generation occurs through multiple reaction pathways comprising excimer formation, water interaction with excited bisulfide ions, and radical-mediated electron transfer. The $H_2S$ gas is continuously flowed through the reaction mixture. The dissolved $H_2S$ species induce morphological changes in NaCl crystals from smooth surfaces to fragmented, flake-like structures.

11 Claims, 9 Drawing Sheets

100

(51) Int. Cl.

| | |
|---|---|
| ***B01D 53/52*** | (2006.01) |
| ***B01D 53/78*** | (2006.01) |
| ***B01F 23/233*** | (2022.01) |
| ***B01F 33/45*** | (2022.01) |
| ***B01J 19/00*** | (2006.01) |
| ***C01B 3/042*** | (2026.01) |
| ***G01N 23/2209*** | (2018.01) |
| ***G01N 30/02*** | (2006.01) |
| ***G01N 30/88*** | (2006.01) |

(56) References Cited

OTHER PUBLICATIONS

Baykara et al. "Hydrogen from hydrogen sulphide in Black Sea" International Journal of Hydrogen Energy, 2007, 32, 1246-1250 (Year: 2007).*

* cited by examiner

PHOTOCATALYST-FREE SEAWATER HYDROGEN SULFIDE SPLITTING FOR HYDROGEN PRODUCTION

FIELD OF INVENTION

The present disclosure relates to hydrogen production from hydrogen sulfide waste streams, and more particularly to a photocatalyst-free method for decomposing hydrogen sulfide dissolved in seawater using solar irradiation to simultaneously produce hydrogen and detoxify toxic waste.

BACKGROUND

Hydrogen production has emerged as a promising approach for clean energy generation and storage, offering potential solutions for reducing dependence on fossil fuels. Traditional hydrogen production methods, such as steam methane reforming and electrolysis, face challenges including high energy consumption, carbon dioxide emissions, and substantial infrastructure costs. These limitations have driven research toward alternative hydrogen production pathways that can utilize renewable energy sources and waste materials.

Hydrogen sulfide represents both an environmental challenge and a potential resource. This toxic gas is generated from various industrial processes, including petroleum refining, natural gas processing, coal gasification, and organic matter decomposition. Hydrogen sulfide poses health risks at concentrations as low as 10 parts per million and can be fatal at higher concentrations. Current treatment methods, such as the Claus process, involve thermal oxidation and catalytic reactions to convert hydrogen sulfide to elemental sulfur, but these approaches consume substantial energy and may generate additional pollutants.

Photocatalytic and photolytic processes have been explored for hydrogen production from various feedstocks, including water and sulfur-containing compounds. These light-driven approaches offer the advantage of utilizing solar energy, potentially reducing the overall energy input for hydrogen generation. However, many photocatalytic systems rely on expensive or unstable catalysts that may deactivate over time, limiting their practical application.

Seawater represents an abundant resource, comprising approximately 96.5% of Earth's total water resources. The complex ionic composition of seawater, containing sodium chloride, magnesium chloride, calcium chloride, potassium chloride, and sulfate ions, presents both opportunities and challenges for electrochemical and photochemical processes. While seawater's availability makes it attractive for large-scale applications, the presence of various ions can influence reaction kinetics and product selectivity in ways that differ from pure water systems.

The intersection of hydrogen sulfide waste treatment and hydrogen production presents opportunities for developing integrated processes that address environmental concerns while generating valuable products. Such approaches could potentially transform waste streams into useful energy carriers, supporting circular economy principles and reducing the environmental impact of industrial operations.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method for producing hydrogen is provided. The method comprises providing seawater containing dissolved salts including sodium chloride (NaCl). The method comprises introducing hydrogen sulfide ($H_2S$) gas into the seawater to form a reaction mixture containing dissolved $H_2S$ and bisulfide ions ($HS^-$). The method comprises exposing the reaction mixture to solar irradiation in the absence of any photocatalyst. The method comprises generating hydrogen gas through photo-excitation of the bisulfide ions and seawater splitting facilitated by the dissolved $H_2S$ species.

According to other aspects of the present disclosure, the method may include one or more of the following features. The seawater may have a NaCl concentration of approximately 3.5 wt. %. The method may further comprise maintaining the reaction mixture at ambient temperature during the solar irradiation. The solar irradiation may be provided by a xenon lamp simulating solar light. The hydrogen gas generation may occur through multiple reaction pathways including excimer formation, water interaction with excited bisulfide ions, and radical-mediated electron transfer. The method may further comprise continuously flowing the $H_2S$ gas through the reaction mixture at a flow rate of approximately 3 mL/min. The dissolved $H_2S$ species may induce morphological changes in NaCl crystals from smooth surfaces to fragmented, flake-like structures. The method may achieve a hydrogen production rate of at least 25.89 $mol\cdot L^{-1}\cdot min^{-1}$.

The method may exclude the use of sacrificial agents selected from methanol, ethanol, and glycerol. The seawater may comprise additional salts selected from $MgCl_2$, $Na_2SO_4$, $CaCl_2$, and KCl in concentrations representative of natural seawater composition. The method may result in sulfur adsorption on salt surfaces as confirmed by energy dispersive X-ray spectroscopy analysis.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIGS. 3A-3D show SEM images of NaCl: FIGS. 3A-3B before, FIGS. 3C-3D after photoreaction reaction under H2S flow, and FIG. 3E EDX of NaCl after photoreaction reaction under $H_2S$ flow.

FIGS. 6A-6B show the effect of sacrificial agent on $H_2$ yield using seawater (3.5% NaCl) under FIG. 6(A) $N_2$ flow and FIG. 6(B) $H_2S$ flow. FIGS. 6C-6E show by products yields using seawater (3.5% NaCl) under $H_2S$ flow with different sacrificial agents: FIG. 6C methanol, FIG. 6D ethanol, and FIG. 6E glycerol.

DEFINITIONS

Figure 1:
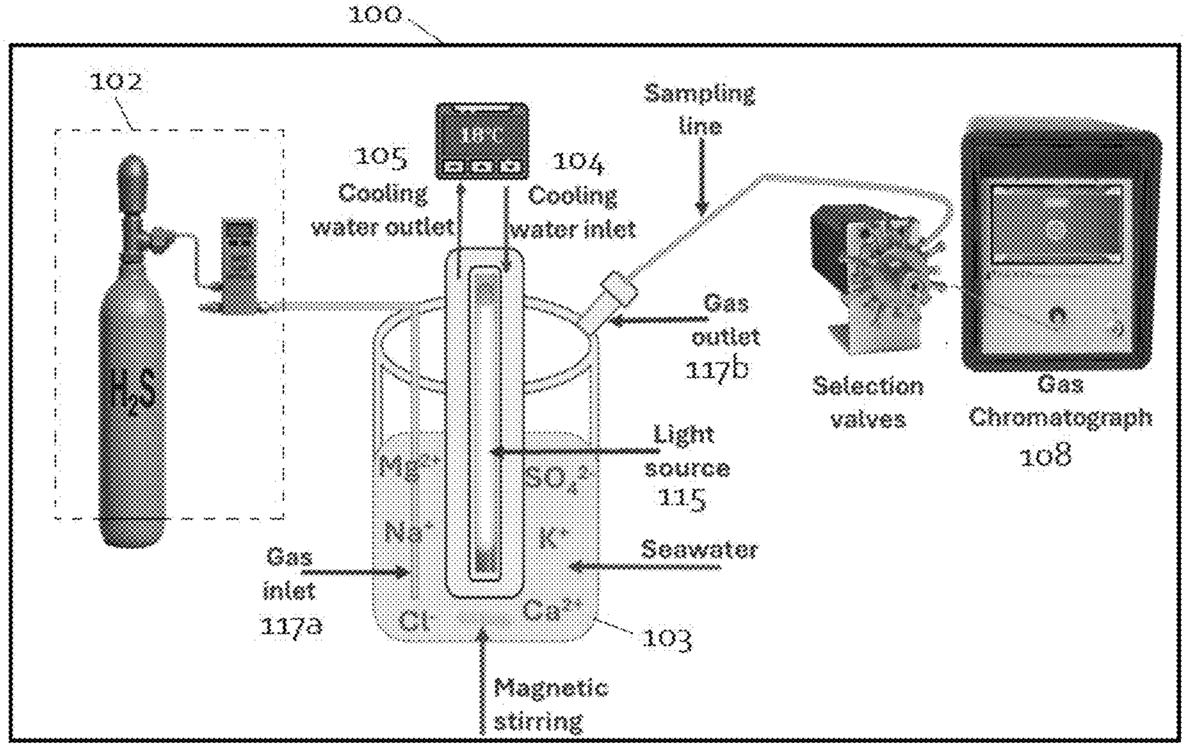
FIG. 1 illustrates a schematic diagram of a photolytic hydrogen production system, according to aspects of the present disclosure.

As used herein, the term "photolytic hydrogen sulfide decomposition system" refers to an integrated apparatus comprising a photoreactor, gas flow control components, light source, and analytical equipment configured to decompose hydrogen sulfide ($H_2S$) dissolved in seawater through solar irradiation without the use of photocatalysts, wherein the system operates through photoexcitation of bisulfide ions ($HS^-$) to generate hydrogen gas and elemental sulfur products.

As used herein, the term "hydrogen yield measurements" refers to quantitative determinations of hydrogen gas production rates expressed in units of $mol \cdot L^{-1} \cdot min^{-1}$, measured over specified time intervals under controlled experimental conditions including defined gas flow rates, temperature, light irradiation, and seawater composition parameters.

As used herein, the term "photoreaction" refers to the light-induced chemical transformation process wherein bisulfide ions ($HS^-$) undergo photoexcitation upon exposure to solar or simulated solar irradiation, leading to hydrogen gas evolution through multiple reaction pathways including excimer formation, water interaction, and radical-mediated electron transfer mechanisms.

As used herein, the term "dissociation pathways" refers to the multiple chemical reaction routes through which dissolved hydrogen sulfide ($H_2S$) in seawater undergoes transformation, including: (1) direct $H_2S$ decomposition to hydrogen and elemental sulfur, (2) bisulfide ion ($HS^-$) conversion through three distinct photolytic schemes, and (3) $H_2S$-facilitated seawater splitting processes that enhance overall hydrogen production beyond stoichiometric expectations.

As used herein, the term "seawater salt ions" refers to the dissolved ionic species naturally present in seawater or synthetic seawater compositions, including but not limited to sodium ions ($Na^+$), chloride ions ($Cl^-$), potassium ions ($K^+$), magnesium ions ($Mg^{2+}$), calcium ions ($Ca^{2+}$), and sulfate ions ($SO_4^{2-}$), wherein different ionic species exhibit varying effects on hydrogen production efficiency ranging from enhancement to inhibition.

As used herein, the term "sacrificial agents" refers to organic compounds including methanol, ethanol, and glycerol that are commonly employed in photocatalytic systems as electron donors or hole scavengers, but which in the context of this photolytic $H_2S$ decomposition system exhibit inhibitory effects on hydrogen production when present during $H_2S$ flow conditions due to competition for photon absorption, reduced $H_2S$ solubility, and interference from byproduct formation.

As used herein, the term "photolytic hydrogen sulfide-assisted hydrogen production" refers to the integrated process mechanism wherein hydrogen sulfide serves dual functions as both a reactive substrate for direct photolytic decomposition and as a facilitating agent that enhances seawater splitting through morphological modifications of salt crystals and sulfur adsorption on salt surfaces, resulting in hydrogen production rates exceeding those achievable through individual pathway contributions.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a photolytic hydrogen sulfide decomposition system for green hydrogen production using seawater. The system provides a photocatalyst-free approach for converting hydrogen sulfide ($H_2S$) dissolved in seawater into hydrogen gas ($H_2$) through solar irradiation.

Conventional methods for hydrogen sulfide conversion typically rely on complex photocatalysts that may be unstable, expensive, or subject to deactivation over time. In contrast, the disclosed system operates without photocatalysts, instead utilizing the intrinsic properties of seawater and hydrogen sulfide under solar irradiation to achieve hydrogen production.

The system addresses dual objectives of detoxifying toxic hydrogen sulfide waste and generating green hydrogen fuel. Hydrogen sulfide may originate from industrial sources or natural processes and presents environmental and safety challenges due to its toxic nature. The disclosed approach converts this hazardous compound into valuable hydrogen fuel while utilizing seawater as the reaction medium.

The process exploits the synergistic effects between dissolved hydrogen sulfide and seawater constituents to enhance hydrogen production. Seawater contains various ionic species that may influence the photolytic decomposition process and hydrogen evolution rates. The system operates through multiple reaction pathways involving the chemical conversion of bisulfide ions and direct seawater splitting under solar irradiation.

The photolytic process may be initiated by photoexcitation of bisulfide ions ($HS^-$), which can lead to hydrogen evolution through various mechanisms including excimer formation, water interaction, or radical-mediated electron transfer. The system may operate continuously with controlled gas flow and simulated or natural solar irradiation at ambient temperatures.

The disclosed approach utilizes abundant and readily available resources, including seawater and hydrogen sulfide waste streams, making the process suitable for industrial applications where hydrogen sulfide management and hydrogen production are desired. The system may provide a closed-loop process for converting toxic waste into clean energy carriers while avoiding the complexities associated with photocatalyst-based systems.

The photolytic hydrogen sulfide decomposition system comprises several interconnected components arranged to facilitate the conversion of hydrogen sulfide dissolved in seawater into hydrogen gas through solar irradiation. FIG. 1 illustrates the overall system configuration and component arrangement.

The system includes a photoreactor 100 that serves as the primary reaction vessel for the photolytic decomposition process. The photoreactor may be constructed from quartz material to allow transmission of solar or simulated solar radiation to the seawater medium contained within. The quartz photoreactor provides optical transparency across the relevant wavelength spectrum while maintaining chemical resistance to the seawater and hydrogen sulfide environment.

A gas flow control system 102 regulates the introduction of hydrogen sulfide gas into the photoreactor. The gas flow controller connects to a hydrogen sulfide gas source and controls the flow rate of $H_2S$ gas delivered to the seawater medium. The controlled gas flow enables continuous operation and maintains desired concentrations of dissolved hydrogen sulfide in the seawater. The photoreactor 100 incorporates a magnetic stirring mechanism positioned at the base of the reactor vessel 103. The magnetic stirring system provides continuous mixing of the seawater medium during operation, which may enhance mass transfer and maintain uniform distribution of dissolved hydrogen sulfide throughout the reaction volume.

Temperature control is maintained through a cooling system that includes cooling water inlet 104 and outlet ports 105 connected to the photoreactor 100. The cooling water circulation helps regulate the reaction temperature and may prevent excessive heating that could affect the photolytic process or gas solubility.

A light source 115 provides the photon energy for initiating the photolytic decomposition reactions. In some cases, a xenon lamp may be used to simulate solar irradiation. The xenon lamp may have a power rating of 500 W to provide sufficient light intensity for the photolytic process. The light source may be positioned to direct radiation toward the photoreactor contents and may include optical components to focus or distribute the light as needed.

The photoreactor includes gas inlet and outlet ports (117*a* and 117*b*) to facilitate the controlled introduction of hydrogen sulfide gas and the removal of product gases. The gas outlet port directs the produced hydrogen and other gases from the photoreactor to the analytical equipment for detection and measurement. Analytical equipment connects to the system to monitor and measure the gas products generated during the photolytic process. A gas chromatograph (GC) 108 may be connected to the photoreactor through a gas outlet port 117*b* to analyze the composition and quantities of hydrogen and other gases produced. The gas chromatograph 108 enables real-time or periodic analysis of the reaction products and allows monitoring of hydrogen production rates.

The seawater medium within the photoreactor contains various ionic species that may participate in or influence the photolytic decomposition process. The seawater may include sodium ions ($Na^+$), potassium ions ($K^+$), chloride ions ($Cl^-$), sulfate ions $$(SO_4^{2-}),$$

and other constituents typically present in natural or synthetic seawater compositions.

The system configuration allows for continuous operation with steady-state conditions maintained through controlled gas flow, temperature regulation, and continuous mixing. The arrangement of components facilitates monitoring and control of the photolytic process while enabling collection and analysis of the hydrogen gas products.

The seawater medium serves as the reaction environment for the photolytic hydrogen sulfide decomposition process. The seawater composition and ionic constituents may influence the hydrogen production rates and overall process performance through various mechanisms.

The seawater medium may contain sodium chloride (NaCl) as a primary constituent, with concentrations that may be adjusted to optimize hydrogen evolution. In some cases, a 3.5 wt. % NaCl solution provides enhanced hydrogen production compared to other salt concentrations or pure water systems. The 3.5 wt. % concentration corresponds to typical natural seawater salinity levels and may represent an optimal balance for the photolytic decomposition process.

Figure 5A:
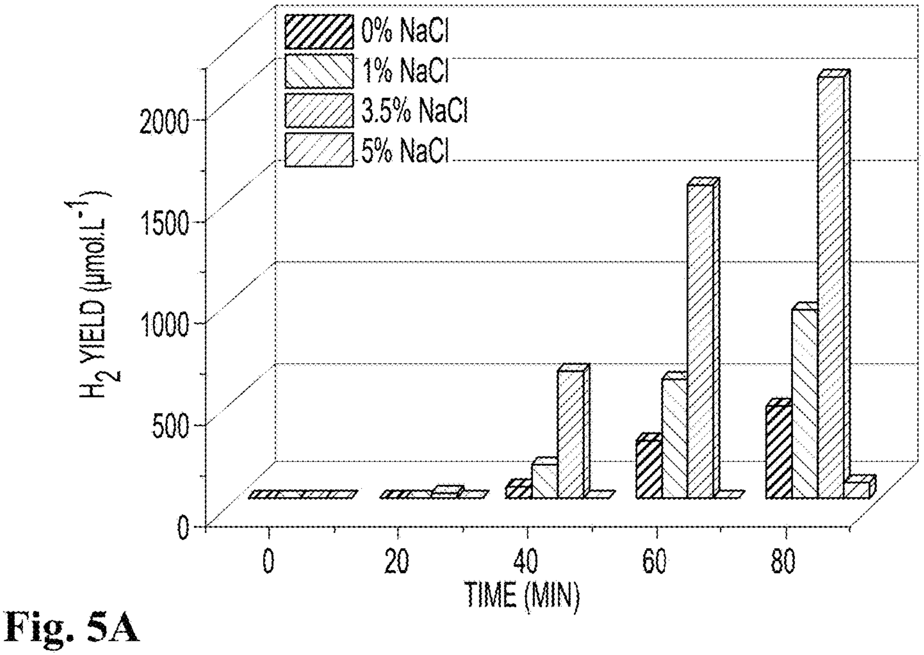
FIGS. 5A-5B show the effect of FIG. 5A NaCl concentration and FIG. 5B other seawater salt ions on $H_2$ yield under $H_2S$ flow.
Figure 5B:
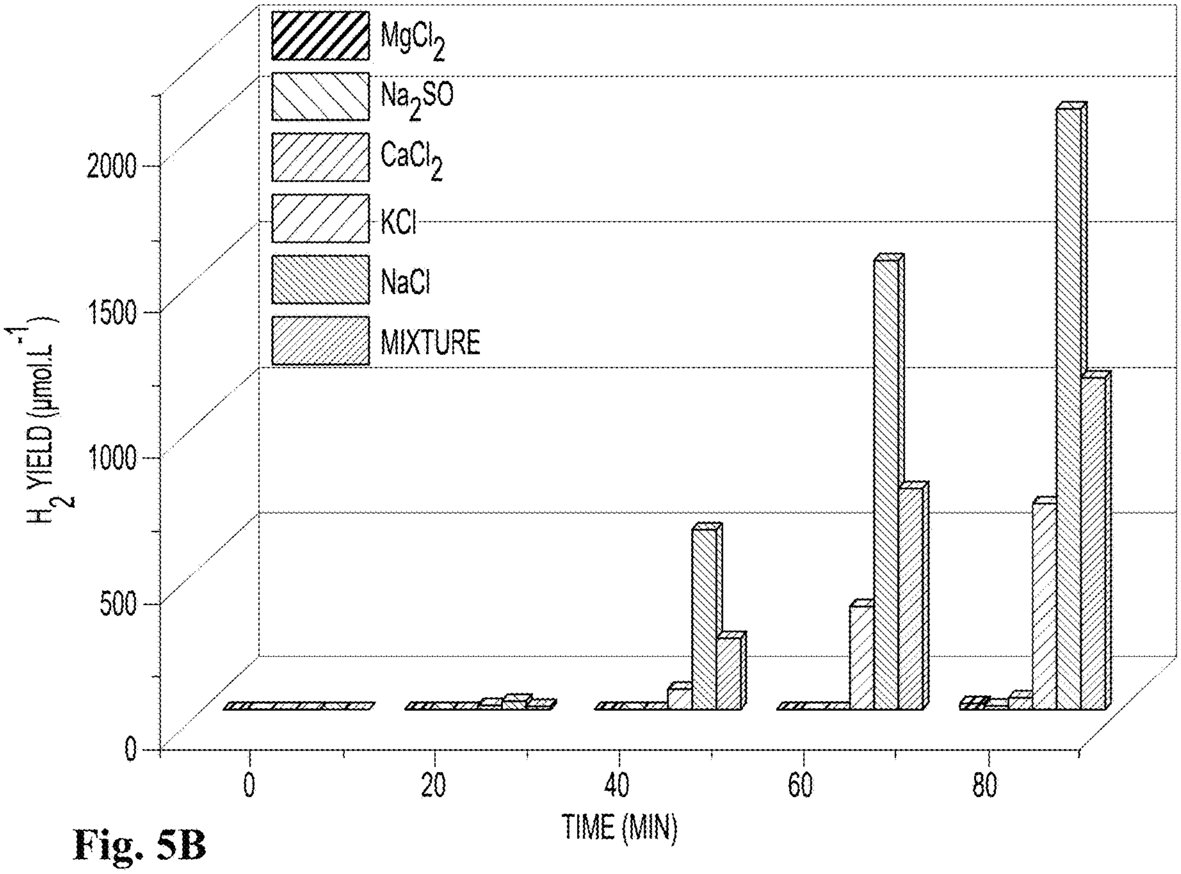

FIGS. 5A-5B illustrate the effects of different NaCl concentrations and various seawater salt ions on hydrogen yield under $H_2S$ flow conditions. The data demonstrates that hydrogen production varies with salt concentration, with specific concentrations providing enhanced performance compared to salt-free water systems.

Different seawater ions exhibit varying effects on the hydrogen production process. Sodium ions ($Na^+$) and chloride ions (Cl®) from NaCl enhance hydrogen evolution through mechanisms that may involve ionic conductivity enhancement or participation in the photolytic reaction pathways. Potassium chloride (KCl) also contributes to enhanced hydrogen production when present in the seawater medium.

Other seawater constituents have different effects on the process performance. Magnesium chloride ($MgCl_2$), calcium chloride ($CaCl_2$), and sodium sulfate ($Na_2SO_4$) exhibit inhibitory effects on hydrogen production. These salts interfere with the photolytic process through mechanisms that include reduced $H_2S$ solubility, altered ionic interactions, or competition for reactive sites.

In an embodiment, the ionic composition of the seawater medium may be tailored to maximize hydrogen output by adjusting the concentrations of beneficial ions while minimizing the presence of inhibitory species. In some cases, synthetic seawater compositions may be formulated to include NaCl and KCl while excluding or reducing concentrations of $MgCl_2$, $CaCl_2$, and $Na_2SO_4$.

The seawater medium may undergo compositional and morphological changes during the photolytic process. The dissolved $H_2S$ may interact with the salt constituents, leading to sulfur adsorption on salt surfaces and morphological transformations of the salt crystals. These interactions may contribute to the enhanced hydrogen production observed in seawater systems compared to pure water systems.

The pH of the seawater medium may influence the speciation of dissolved $H_2S$ and the formation of bisulfide ions ($HS^-$). The natural pH of seawater may provide conditions that favor the formation of reactive species that participate in the photolytic hydrogen production pathways.

Temperature effects on the seawater medium may also influence the process performance. The solubility of $H_2S$ in seawater may vary with temperature, and the ionic mobility and reaction kinetics may be temperature dependent. The system may operate at ambient temperatures, which may provide favorable conditions for gas solubility while maintaining reasonable reaction rates.

Figure 2A:
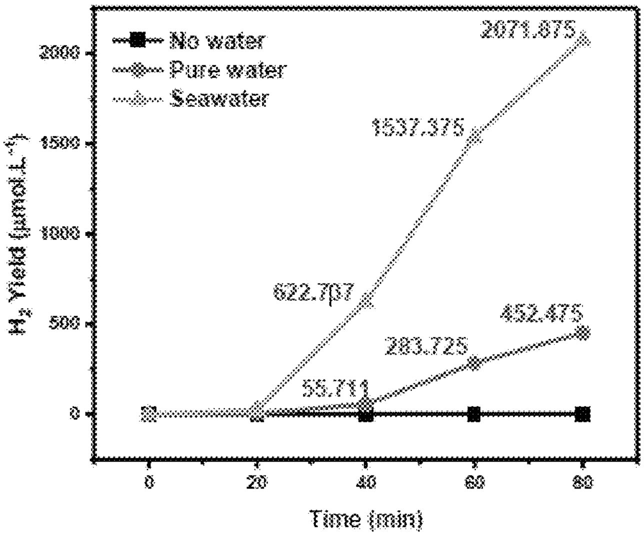
FIG. 2A shows the effect of water type on $H_2$ yield under $H_2S$ flow.
Figure 2B:
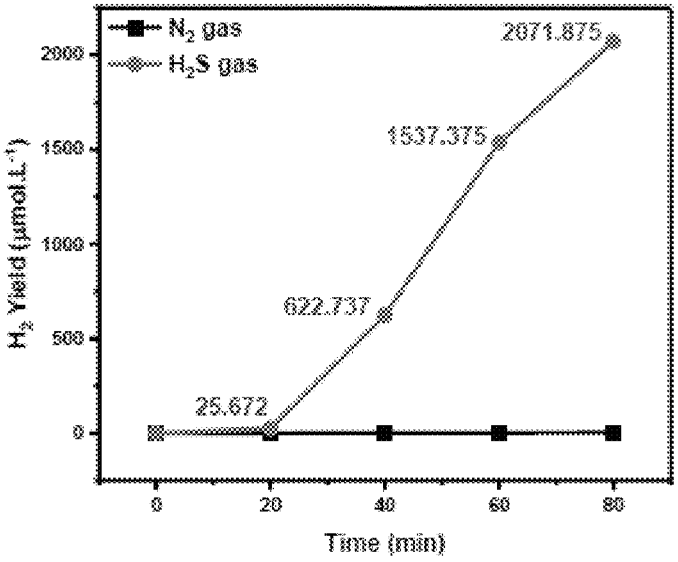
FIG. 2B shows $H_2$ yields using seawater under $N_2$ and $H_2S$ flow.

The hydrogen production performance of the photolytic hydrogen sulfide decomposition system varies with different experimental conditions, including water type and gas flow environment. FIGS. 2A-2B depict hydrogen yield measurements over time under various experimental conditions, demonstrating the effects of different water systems and gas environments on hydrogen production rates.

FIG. 2A shows the effect of water type on $H_2$ yield under $H_2S$ flow, and FIG. 2B shows $H_2$ yields using seawater under $N_2$ and $H_2S$ flow. The role of hydrogen sulfide in seawater splitting for hydrogen production can be elucidated through various hypotheses and proposed reaction mechanisms. These include photolytic and intermediate species pathways, which may influence both the thermodynamics and kinetics of the hydrogen evolution reaction (HER).

The hydrogen evolution data shows enhanced performance when seawater is used as the reaction medium compared to pure water systems. In some cases, seawater may achieve hydrogen yields of 25.89 $\mu mol \cdot L^{-1} \cdot min^{-1}$ under $H_2S$ flow conditions. This performance may be compared to pure water systems, which may produce hydrogen at rates of 5.65 $mol \cdot L^{-1} \cdot min^{-1}$ under similar conditions. The enhanced performance in seawater systems may be attributed to the ionic constituents present in seawater that may facilitate the photolytic decomposition process.

The gas flow environment influences the hydrogen production rates achieved by the system. Under $H_2S$ gas flow conditions, the system may demonstrate enhanced hydrogen evolution compared to inert gas environments. The presence of $H_2S$ gas provides the reactive species for the photolytic decomposition process, while inert gas conditions limit the availability of hydrogen sulfide for conversion to hydrogen gas.

The comparison between different water types reveals the role of seawater constituents in enhancing the photolytic process. Pure water systems may lack the ionic species that contributes to enhanced reaction kinetics or provides alternative reaction pathways for hydrogen production. The seawater medium contains dissolved salts that participate in the photolytic decomposition process or modify the chemical environment to favor hydrogen evolution.

The hydrogen yield data demonstrates time-dependent behavior, with production rates that may vary during the course of the photolytic process. The system achieves steady-state hydrogen production rates after an initial period, indicating that the photolytic decomposition process reaches equilibrium conditions under continuous $H_2S$ flow and solar irradiation. The performance differences between seawater and pure water systems may be quantified through direct comparison of hydrogen evolution rates under identical experimental conditions. The approximately 4.6-fold enhancement in hydrogen production when using seawater compared to pure water demonstrates the beneficial effects of seawater constituents on the photolytic decomposition process.

The gas flow conditions may affect the dissolution and availability of $H_2S$ in the aqueous medium. Continuous $H_2S$ flow may maintain saturation levels of dissolved hydrogen sulfide, providing a steady supply of reactive species for the photolytic process. The flow rate and gas composition may be controlled to optimize the hydrogen production performance of the system.

Figure 3A:
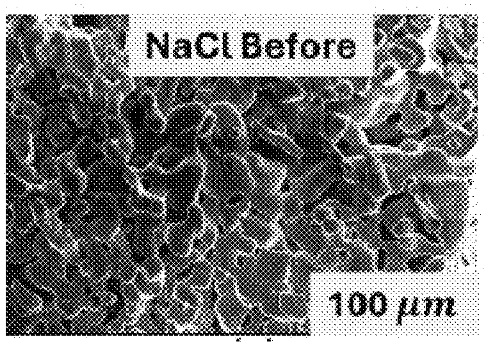
FIGS. 3A-3D illustrate scanning electron microscopy (SEM) images of NaCl before and after photoreaction under $H_2S$ flow, along with corresponding energy-dispersive X-ray spectroscopy (EDX) analysis data.
Figure 3B:
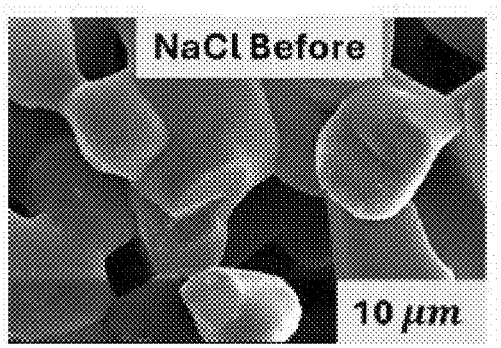
Figure 3C:
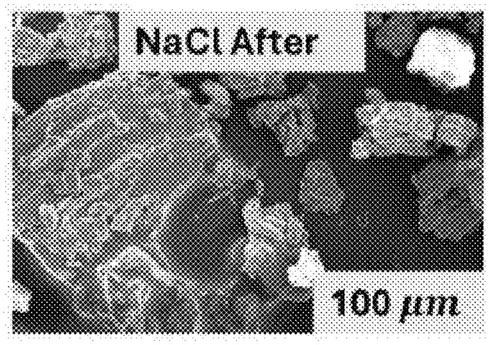
Figure 3D:
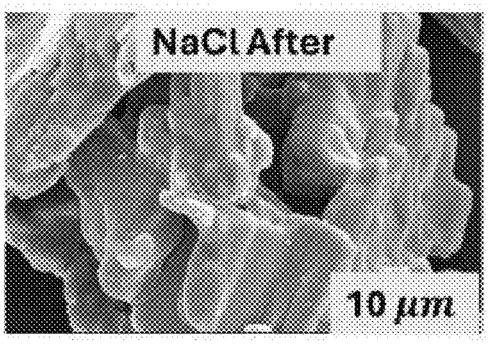
Figure 3E:
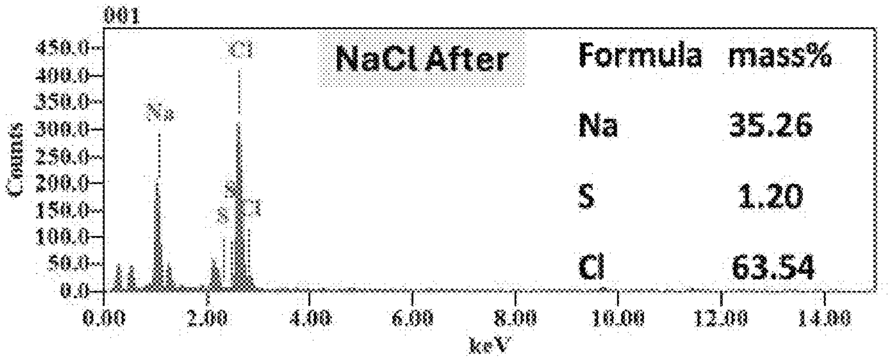

The photolytic hydrogen sulfide decomposition process may induce morphological and compositional transformations in seawater salt constituents during operation. FIGS. 3A-3D illustrate scanning electron microscopy (SEM) images of NaCl before and after photoreaction under $H_2S$ flow, along with corresponding energy-dispersive X-ray spectroscopy (EDX) analysis data. FIGS. 3A-3D show SEM images of NaCl: FIGS. 3A-3B before, FIGS. 3C-3D after photoreaction reaction under H2S flow, and FIG. 3E EDX of NaCl after photoreaction reaction under $H_2S$ flow.

The morphological changes in NaCl may be observed through comparative SEM imaging before and after the photolytic process. Prior to photoreaction, NaCl may exhibit a highly interconnected structure characterized by smooth surfaces and large, well-defined particles featuring flat facets. The salt crystals may display regular geometric forms with continuous surface features that reflect the crystalline structure of sodium chloride.

Following the photolytic process under $H_2S$ flow conditions, the NaCl morphology undergoes transformation to fragmented, flake-like particles with more uneven features and layered structures. The smooth surfaces observed in the initial salt crystals may be replaced by roughened, fragmented surfaces that may indicate structural changes induced by the photolytic decomposition process. The compositional analysis of the salt surfaces may be performed using EDX spectroscopy to determine elemental composition changes during the photolytic process. An EDX analysis provides quantitative data on the elemental composition of NaCl after photoreaction, confirming the presence of sodium, sulfur, and chlorine elements with corresponding mass percentages.

The EDX analysis reveals sulfur adsorption on NaCl surfaces following the photoreaction process. In some cases, the sulfur content detected on the salt surfaces reaches 1.2 wt. % after exposure to the photolytic $H_2S$ decomposition process. The presence of sulfur on the salt surfaces indicates interaction between the dissolved $H_2S$ species and the seawater salt constituents during the photolytic process.

The morphological transformations and sulfur adsorption provides a mechanistic basis for the enhanced hydrogen production performance observed in seawater systems compared to pure water systems. The structural changes in the salt crystals creates additional surface area or reactive sites that facilitate the photolytic decomposition process or provide alternative reaction pathways for hydrogen evolution.

FIGS. 5A-5B show the effect of FIG. 5A NaCl concentration and FIG. 5B other seawater salt ions on $H_2$ yield under $H_2S$ flow.

The seawater environment specifies the ionic composition and concentration parameters that may influence the salt transformation process during photolytic operation.

Gas flow conditions may also influence the extent of morphological changes and sulfur adsorption on salt surfaces. The gas flow conditions may determine the concentration and availability of $H_2S$ species for interaction with the seawater salt constituents, which may affect the degree of surface modification and compositional changes observed in the salt crystals. The correlation between morphological changes and hydrogen production performance may suggest that the salt surface modifications contribute to the enhanced photolytic decomposition process. The fragmented, flake-like structures may provide increased surface area for interaction with dissolved $H_2S$ species, while the sulfur adsorption indicates active participation of the salt surfaces in the photolytic reaction pathways.

The EDX analysis also confirms the retention of sodium and chlorine elements in the salt structure following the photolytic process, indicating that the morphological changes may occur without complete dissolution or loss of the salt constituents. The preservation of the salt matrix with surface modifications allows for continued participation in the photolytic process during extended operation periods.

Figure 4:
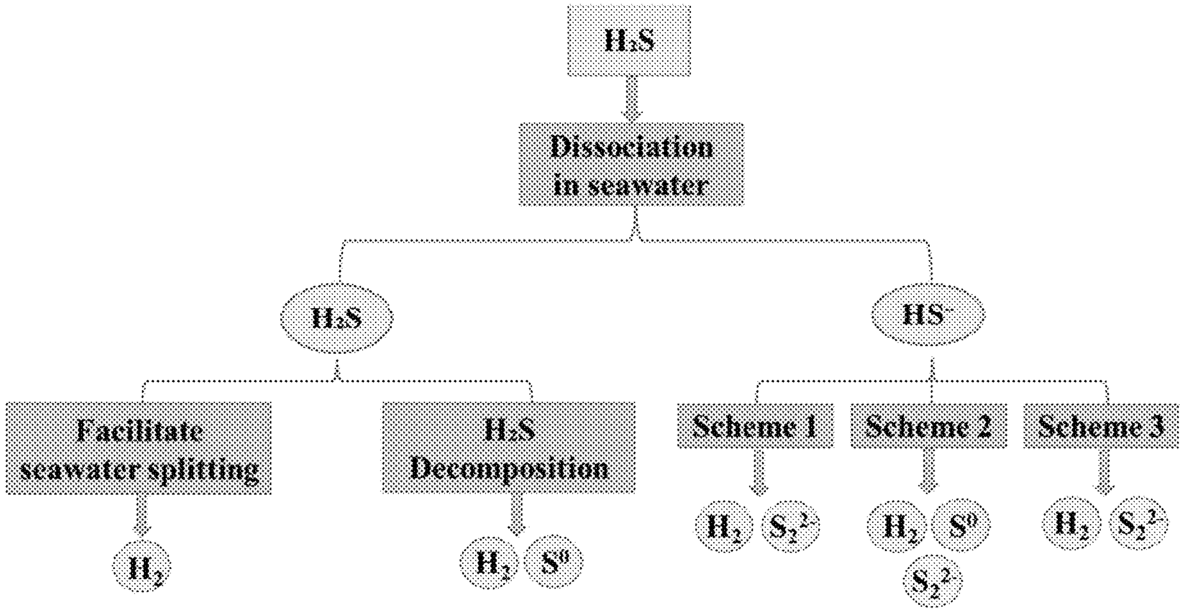
FIG. 4 illustrates the dissociation pathways and products for $H_2S$ gas dissolved in seawater medium, showing the various routes through which hydrogen production may occur.

The photolytic hydrogen sulfide decomposition process operates through multiple reaction pathways that enable hydrogen generation from dissolved $H_2S$ species in seawater. FIG. 4 illustrates the dissociation pathways and products for $H_2S$ gas dissolved in seawater medium, showing the various routes through which hydrogen production may occur.

The $H_2S$ dissociation process begins when hydrogen sulfide gas dissolves in the seawater medium and undergoes chemical transformations under solar irradiation. The dissolved $H_2S$ follows two main pathways following dissociation in seawater. The first pathway involves $H_2S$ species that may facilitate seawater splitting to produce $H_2$, while the second pathway involves direct $H_2S$ decomposition to generate $H_2$ and elemental sulfur ($S^0$). The formation of bisulfide ions ($HS^-$) occurs through the dissociation of $H_2S$ in the seawater medium. The $HS^-$ species proceeds through three distinct photolytic reaction schemes under solar irradiation. Scheme 1 results in the production of $H_2$ and disulfide ions $$(S_2^{2-}).$$

Scheme 2 leads to the formation of $H_2$ and elemental sulfur ($S^0$). Scheme 3 generates $H_2$ and disulfide ions $$(S_2^{2-})$$

through an alternative reaction pathway.

Figure 7:
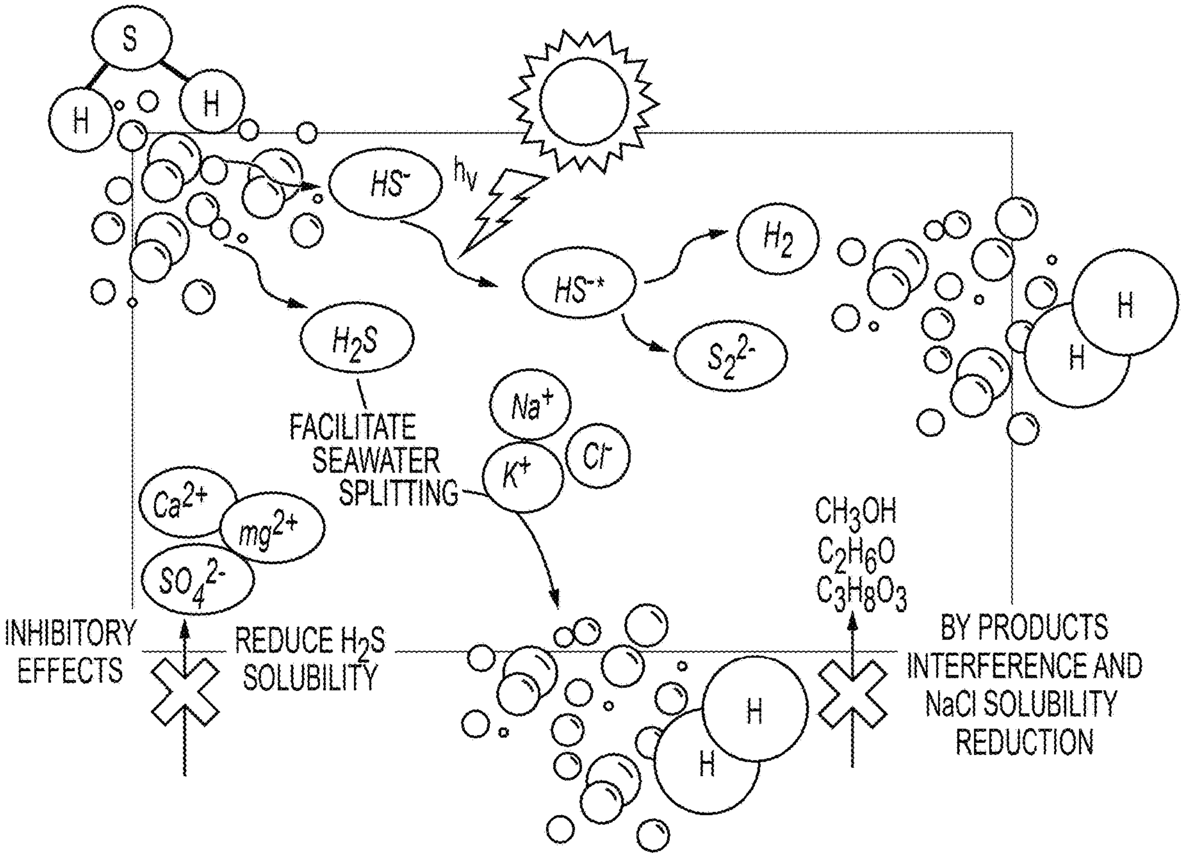
FIG. 7 illustrates a schematic diagram of a mechanism for photolytic hydrogen sulfide-assisted hydrogen production, according to an embodiment.

FIG. 7 provides a schematic illustration of the mechanism for photolytic hydrogen sulfide-assisted hydrogen production using seawater, describing the process of hydrogen evolution from seawater under the photolytic conditions. This Figure illustrates the production rates and yields achieved under different experimental conditions, demonstrating the effectiveness of the multiple reaction pathways. FIG. 7 also depicts the chemical pathways and transformations occurring during the photolytic process and shows how photoexcitation of $HS^-$ ions may lead to hydrogen evolution through excimer formation, water interaction, or radical-mediated electron transfer processes. The photoexcitation process generates excited bisulfide species ($HS^{-*}$) that may undergo subsequent reactions to produce hydrogen gas.

The excimer formation pathway involves the interaction of excited $HS^-$ species to form dimeric complexes that decomposes to release hydrogen gas and sulfur-containing products. The water interaction pathway involves direct reaction between excited $HS^-$ species and water molecules in the seawater medium, leading to hydrogen production through proton reduction mechanisms. The radical-mediated electron transfer pathway involves the generation of hydrated electrons from photoexcited $HS^-$ species. These hydrated electrons may be captured by protons ($H^+$) in the seawater medium to form hydrogen atoms, which subsequently combine to produce molecular hydrogen gas.

The parallel nature of these reaction pathways enables simultaneous hydrogen production through multiple mechanisms, contributing to the enhanced hydrogen yields observed in the seawater system. The dissolved $H_2S$ species enhances seawater splitting by imparting catalytic properties to the seawater constituents, particularly sodium chloride, which facilitate additional hydrogen production beyond that expected from $HS^-$ conversion alone.

The measured hydrogen production may exceed the stoichiometric yield expected from $HS^-$ conversion alone, suggesting that the $H_2S$ species enhances the overall seawater splitting process. This enhancement occurs through modification of the ionic environment or through direct participation of $H_2S$ species in the photolytic decomposition of water molecules present in the seawater medium.

The reaction pathways operate under the experimental conditions defined by the gas flow conditions and the seawater environment. The controlled introduction of $H_2S$ gas maintains the concentration of reactive species available for the photolytic transformations, while the seawater ionic composition influences the relative contributions of the different reaction pathways to the overall hydrogen production. The effects of sacrificial agents on hydrogen production performance may vary depending on the gas flow conditions and the specific type of sacrificial agent employed in the photolytic hydrogen sulfide decomposition system.

Methanol, ethanol, and glycerol organic compounds may be commonly used in photocatalytic systems to enhance hydrogen evolution by serving as electron donors or hole scavengers. However, the photolytic hydrogen sulfide decomposition system exhibits different behavior when these sacrificial agents are introduced.

Figure 6A:
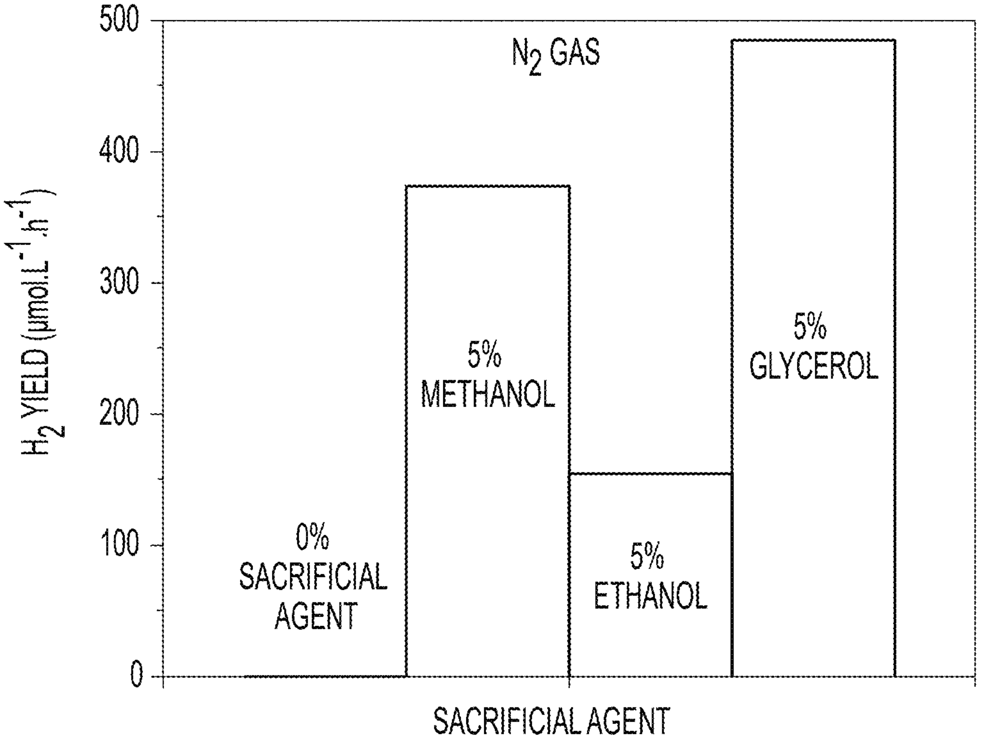
FIGS. 6A-6E illustrate the comparative effects of sacrificial agents on hydrogen yield using seawater under both nitrogen flow and hydrogen sulfide flow conditions.
Figure 6B:
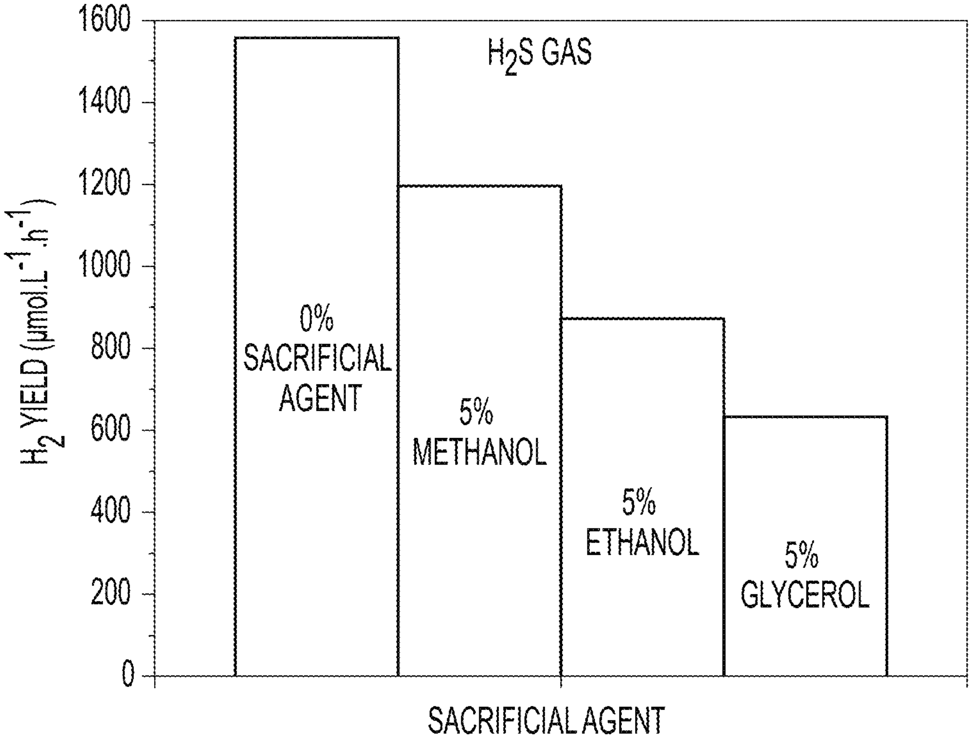
Figure 6C:
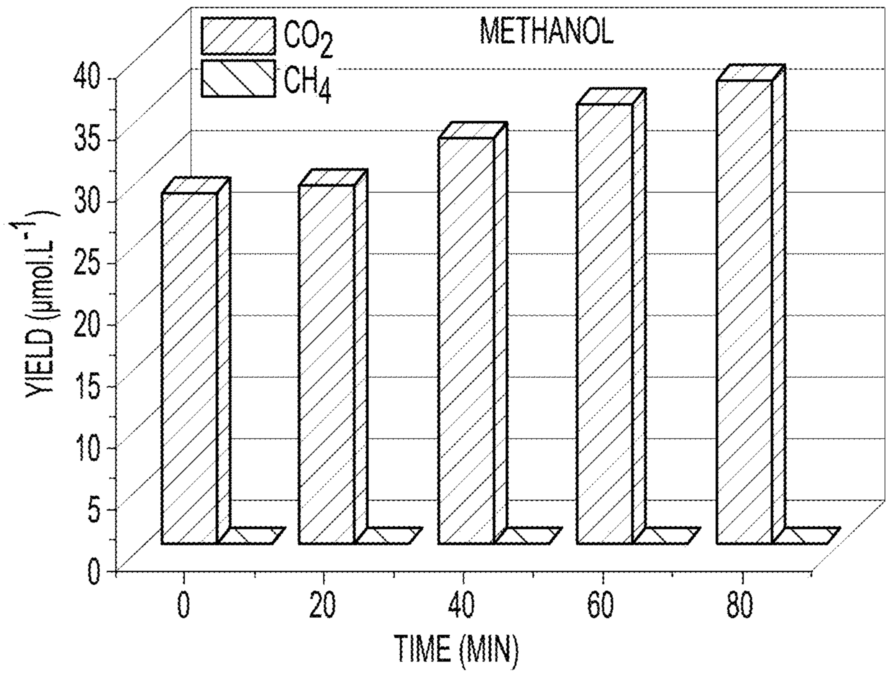
Figure 6D:
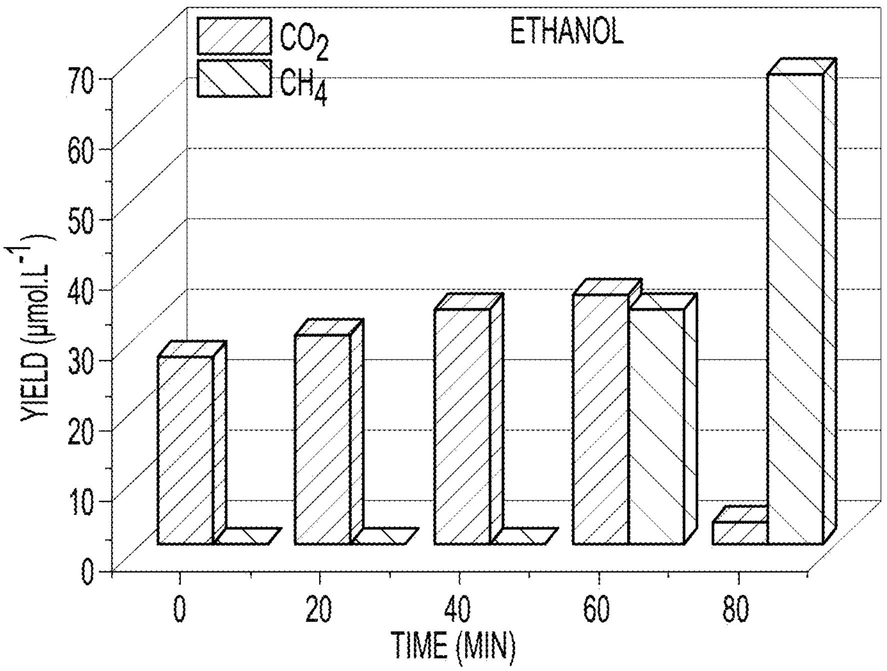
Figure 6E:
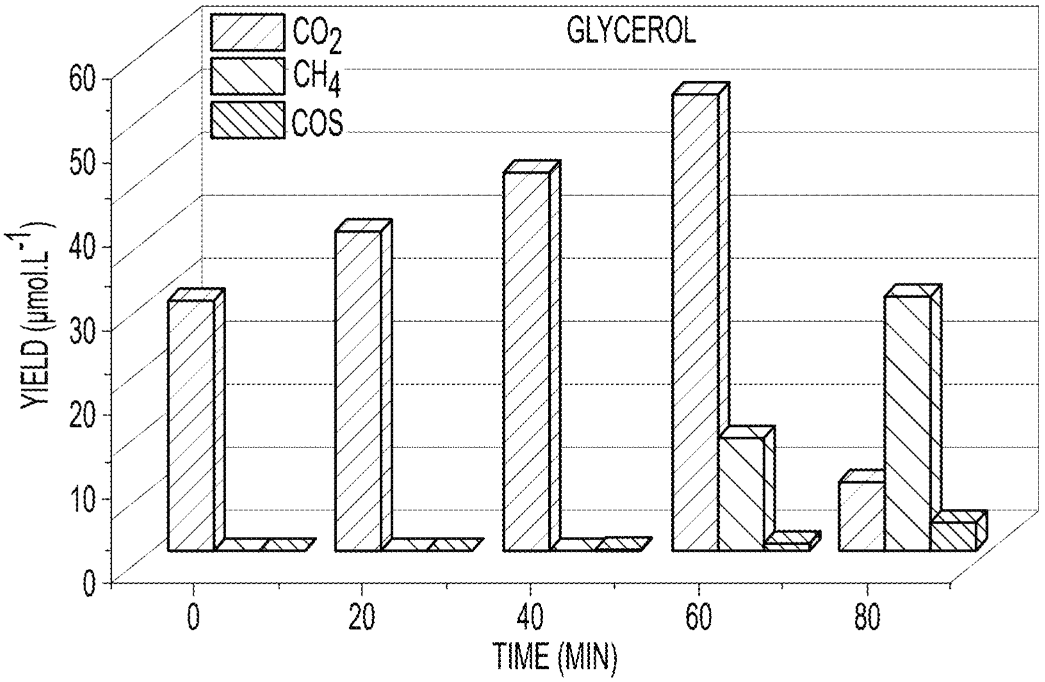

FIG. 6A-6E illustrate the comparative effects of sacrificial agents on hydrogen yield using seawater under both nitrogen flow and hydrogen sulfide flow conditions. FIGS. 6A-6E show the effect of sacrificial agent on $H_2$ yield using seawater (3.5% NaCl) under FIG. 6A $N_2$ flow and FIG. 6B $H_2S$ flow. By products yields using seawater (3.5% NaCl) under $H_2S$ flow with different sacrificial agents: FIG. 6C methanol, FIG. 6D ethanol, and FIG. 6E glycerol. Under nitrogen gas flow conditions, the addition of sacrificial agents may enhance hydrogen production rates compared to systems without sacrificial agents. The organic compounds may serve as hydrogen sources through photolytic decomposition pathways that may generate hydrogen gas from the carbon-hydrogen bonds present in the sacrificial agent molecules.

Under $H_2S$ flow conditions, the sacrificial agents exhibit inhibitory effects on hydrogen production performance. The presence of methanol, ethanol, or glycerol in the seawater medium reduces the hydrogen evolution rates compared to systems operating without sacrificial agents. This inhibitory behavior may contrast with the typical role of sacrificial agents in conventional photocatalytic systems.

In another embodiment—the data demonstrates that under $H_2S$ flow conditions, the absence of sacrificial agents may result in higher hydrogen yields compared to systems containing organic sacrificial agents. Ethanol reduces hydrogen yield by 44.02% compared to systems without sacrificial agents. Methanol causes a reduction in hydrogen yield of 54.68%, while glycerol results in the largest reduction of 59.42% in hydrogen production performance.

The inhibitory effects of sacrificial agents under $H_2S$ flow conditions may result from several mechanisms that may interfere with the photolytic decomposition process. Competition for photon absorption may occur between the sacrificial agents and the bisulfide ions ($HS^-$) that serve as the primary reactive species in the hydrogen production pathways. The organic compounds may absorb photons in wavelength ranges that may overlap with the absorption spectrum of $HS^-$ species, reducing the photon energy available for bisulfide photoexcitation.

Reduced $H_2S$ solubility in the seawater medium may occur when sacrificial agents are present. The organic compounds may alter the chemical environment of the seawater solution, potentially affecting the dissolution and availability of hydrogen sulfide for the photolytic decomposition reactions. Changes in the dielectric constant of the solvent due to the addition of organic compounds may influence the solubility of both $H_2S$ gas and the seawater salt constituents. Byproduct formation during sacrificial agent decomposition may interfere with the primary hydrogen production pathways. Carbon dioxide ($CO_2$) may be formed through the oxidation of the organic sacrificial agents under the photolytic conditions. The $CO_2$ formation may be observed throughout the experimental duration when organic sacrificial agents are present in the system.

Methane ($CH_4$) production may occur as a secondary byproduct, particularly in systems containing ethanol and glycerol. The methane formation may result from the catalytic conversion of $CO_2$ and hydrogen through $CO_2$ methanation reactions. This conversion pathway consumes hydrogen gas that would otherwise be available as the desired product, contributing to the reduced hydrogen yields observed in the presence of sacrificial agents.

Carbonyl sulfide (COS) may be formed through reactions between $CO_2$ and $H_2S$ when sacrificial agents are present. The formation of COS may represent an additional pathway that may consume both $H_2S$ reactant and $CO_2$ byproduct, potentially affecting the overall reaction stoichiometry and hydrogen production efficiency.

The byproduct formation patterns vary with different sacrificial agents. Glycerol produces the most diverse range of byproducts, including $CO_2$, $CH_4$, and COS, which correlate with the largest reduction in hydrogen yield observed for this sacrificial agent. Ethanol and methanol produce primarily $CO_2$ and $CH_4$, with varying concentrations that correspond to their respective impacts on hydrogen production performance. The interference from byproducts occur through multiple mechanisms that may affect the photolytic hydrogen sulfide decomposition process. Thiosulfate ions $$(S_2O_3^{2-})$$

or other sulfur-containing species are formed through side reactions involving the sacrificial agents and sulfur species present in the system. These compounds inhibit hydrogen evolution by consuming electrons or interfering with the photoexcitation pathways of $HS^-$ ions.

Formaldehyde formation occurs as an intermediate during methanol oxidation reactions. Formaldehyde acts as an $H_2S$ scavenger, reducing the available concentrations of hydrogen sulfide in the system and limiting the substrate availability for the photolytic decomposition process. The scavenging effect contributes to the reduced hydrogen production observed when methanol is present in the seawater medium.

The gas flow conditions also influence the extent of sacrificial agent interference with the hydrogen production process. Continuous $H_2S$ flow maintains higher concentrations of the reactive hydrogen sulfide species, potentially mitigating some of the inhibitory effects of sacrificial agents. However, the data demonstrates that even under continuous $H_2S$ flow conditions, the presence of organic sacrificial agents results in measurable reductions in hydrogen evolution performance. The presence of sodium and chloride ions influences the decomposition pathways of the organic compounds and may affect the formation and stability of the various byproducts observed during sacrificial agent decomposition.

The photolytic hydrogen sulfide decomposition system operates through coordinated interaction of multiple components to achieve continuous hydrogen production from dissolved $H_2S$ in seawater under solar irradiation. The system integration enables sustained operation while maintaining controlled conditions for the photolytic decomposition process.

The gas flow control system 102 regulates the introduction of hydrogen sulfide into the photoreactor through controlled delivery of gas mixtures containing $H_2S$. In some cases, the gas flow conditions may specify using 1% $H_2S$ in $N_2$ at a flow rate of 3 mL/min. The diluted hydrogen sulfide concentration provides controlled dissolution rates while maintaining safety considerations for handling the toxic gas. The nitrogen carrier gas serves as an inert medium that facilitates controlled delivery of $H_2S$ to the seawater medium without introducing reactive species that may interfere with the photolytic process.

The continuous gas flow maintains steady-state concentrations of dissolved $H_2S$ in the seawater medium throughout the operational period. The controlled flow rate ensures adequate supply of reactive hydrogen sulfide species while preventing oversaturation that may lead to gas evolution or reduced dissolution efficiency. The gas flow system 102 operates in conjunction with the magnetic stirring mechanism to enhance mass transfer and maintain uniform distribution of dissolved $H_2S$ throughout the reaction volume.

In another embodiment, temperature control integration is achieved through the cooling water circulation system (that includes cooling water inlet 104 and outlet ports 105 connected to the photoreactor 100) that maintains ambient operating conditions during the photolytic process. The temperature regulation may prevent thermal effects that may alter the solubility of $H_2S$ in seawater or affect the photolytic reaction kinetics. In some cases, the system operates at temperatures around 18° C., which may provide favorable conditions for gas dissolution while maintaining reasonable reaction rates for hydrogen production.

The cooling system may counteract heating effects from the light source 115 during extended operation periods. The xenon lamp or solar irradiation may generate thermal energy that may be absorbed by the seawater medium, potentially affecting the gas solubility and reaction equilibrium. The temperature control system maintains stable thermal conditions that preserve the dissolved $H_2S$ concentrations and reaction environment throughout the operational cycle.

The light source integration with the photoreactor provide the photon energy for initiating the photolytic decomposition reactions while maintaining controlled irradiation conditions. The xenon lamp positioning and optical configuration ensures uniform light distribution across the seawater medium, enabling consistent photoexcitation of bisulfide ions throughout the reaction volume. The light intensity and spectral characteristics are maintained at levels that provide adequate photon flux for the photolytic process without causing excessive heating or photodegradation of system components.

The magnetic stirring system operates continuously during the photolytic process to maintain homogeneous conditions within the seawater medium. The stirring action enhances mass transfer between the gas and liquid phases, promoting dissolution of $H_2S$ and uniform distribution of ionic species throughout the reaction volume. The mixing also facilitates removal of hydrogen gas bubbles that may form during the photolytic decomposition process, preventing gas accumulation that may interfere with light transmission or reaction kinetics.

In another embodiment, the analytical system enables real-time monitoring of hydrogen production rates and gas composition during system operation. The gas chromatograph (108) connection to the photoreactor outlet (117*b*) provides continuous analysis of the product gas stream, allowing measurement of hydrogen evolution rates and detection of byproduct formation. The analytical feedback enables optimization of operational parameters and monitoring of system performance during extended operation periods.

The synergistic effects between system components enhance the overall hydrogen production performance beyond the individual contributions of each element. The combination of controlled gas flow, temperature regulation, and continuous mixing creates optimal conditions for $H_2S$ dissolution and subsequent photolytic decomposition. The seawater ionic environment interacts with the dissolved hydrogen sulfide species under the controlled operational conditions to promote enhanced hydrogen evolution through multiple reaction pathways.

The photoreactor design 100 facilitates efficient light utilization while maintaining controlled chemical conditions for the photolytic process. The quartz construction provides optical transparency for solar or simulated solar radiation while maintaining chemical resistance to the seawater and hydrogen sulfide environment. The reactor geometry optimizes the light path length and reaction volume to maximize photon absorption by the dissolved $HS^-$ species.

The gas handling system operates in a closed-loop configuration that enables continuous processing of $H_2S$ waste streams while collecting the hydrogen product gas. The inlet and outlet gas ports (117*a* and 117*b*) facilitate controlled introduction of the hydrogen sulfide feed and removal of the hydrogen product, enabling integration with industrial $H_2S$ waste management systems or hydrogen collection and purification equipment.

The system integration enables scalable operation through modular design approaches that may accommodate varying throughput requirements. Multiple photoreactor units may be operated in parallel with shared gas flow control, temperature regulation, and analytical systems to increase hydrogen production capacity. The modular approach allows for system sizing based on the available $H_2S$ waste stream volumes and desired hydrogen production rates. The operational stability may be maintained through the coordinated control of gas flow, temperature, and mixing conditions that may prevent system upsets or performance degradation during extended operation. The continuous operation capabilities enable processing of steady $H_2S$ waste streams from industrial sources while providing consistent hydrogen production rates for downstream utilization or storage systems.

A number of implementations have been described. Nevertheless, it will be understood that various modifications may be made without departing from the spirit and scope of the disclosure. Accordingly, other implementations are within the scope of the following claims.

The invention claimed is:

1. A method of producing hydrogen, comprising the steps of:
- providing seawater containing dissolved sodium chloride (NaCl);
- introducing hydrogen sulfide ($H_2S$) gas into the seawater to form a reaction mixture containing dissolved $H_2S$ and bisulfide ions ($HS^-$);
- exposing the reaction mixture to solar irradiation in the absence of any photocatalyst;
- generating hydrogen gas through photoexcitation of the bisulfide ions and seawater splitting facilitated by the dissolved H2S species, and maintaining the reaction mixture at ambient temperature during the solar irradiation.

2. The method of claim 1, wherein the seawater has a NaCl concentration of approximately 3.5 wt. %.

3. The method of claim 1, wherein the ambient temperature is approximately 18° C.

4. The method of claim 1, wherein the solar irradiation is provided by a xenon lamp simulating solar light.

5. The method of claim 1, wherein the hydrogen gas generation occurs through multiple reaction pathways comprising excimer formation, water interaction with excited bisulfide ions, and radical-mediated electron transfer.

6. The method of claim 1, further comprising a step of continuously flowing the $H_2S$ gas through the reaction mixture at a flow rate of approximately 3 mL/min.

7. The method of claim 1, wherein the method achieves a hydrogen production rate of 25.89 $mol \cdot L^{-1} \cdot min^{-1}$.

8. A method for detoxifying hydrogen sulfide waste while producing hydrogen, comprising:
- dissolving hydrogen sulfide ($H_2S$) gas in seawater containing sodium chloride (NaCl) to form bisulfide ions ($HS^-$);
- irradiating the seawater with solar energy without using any photocatalyst;
- photoexciting the bisulfide ions to generate hydrogen gas through multiple reaction pathways including excimer formation and radical-mediated electron transfer;
- simultaneously facilitating seawater splitting through interaction of dissolved $H_2S$ species with seawater constituents, and
- maintaining the seawater at ambient temperature during the solar irradiation to optimize hydrogen sulfide solubility.

9. The method of claim 8, wherein the seawater comprises additional salts selected from the group consisting of $MgCl_2$, $Na_2SO_4$, $CaCl_2$, and KCl in concentrations representative of natural seawater composition.

10. The method of claim 8, wherein the ambient temperature is maintained at approximately 18° C. through a cooling system.

11. The method of claim 8, wherein the multiple reaction pathways further comprise water interaction with excited bisulfide ions to produce elemental sulfur and molecular hydrogen.

* * * * *